J. L. SIMMONS.
MACHINE FOR MAKING AEROPLANE PROPELLERS.
APPLICATION FILED SEPT. 12, 1917. RENEWED JULY 23, 1919.
1,336,659.
Patented Apr. 13, 1920.
7 SHEETS—SHEET 2.
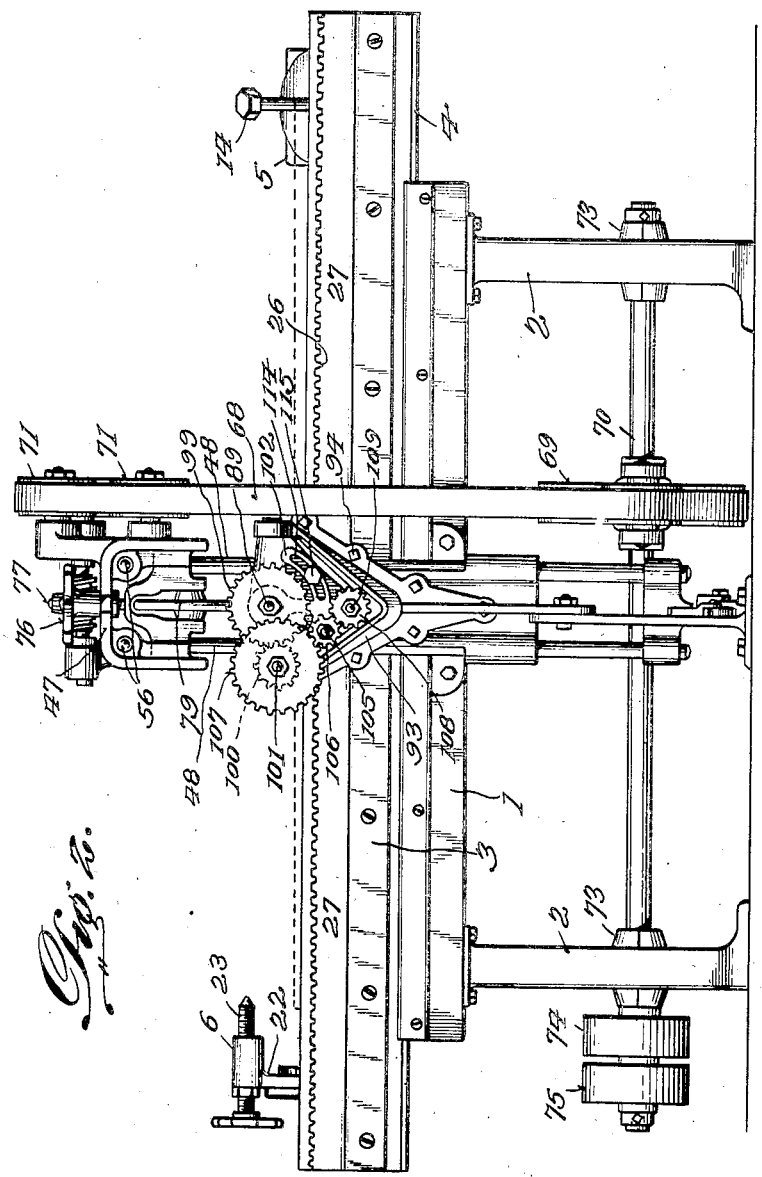
Witness
Frederick L. Fox,
Inventor
James Lee Simmons.
By Wm. E. Dye,
Attorney

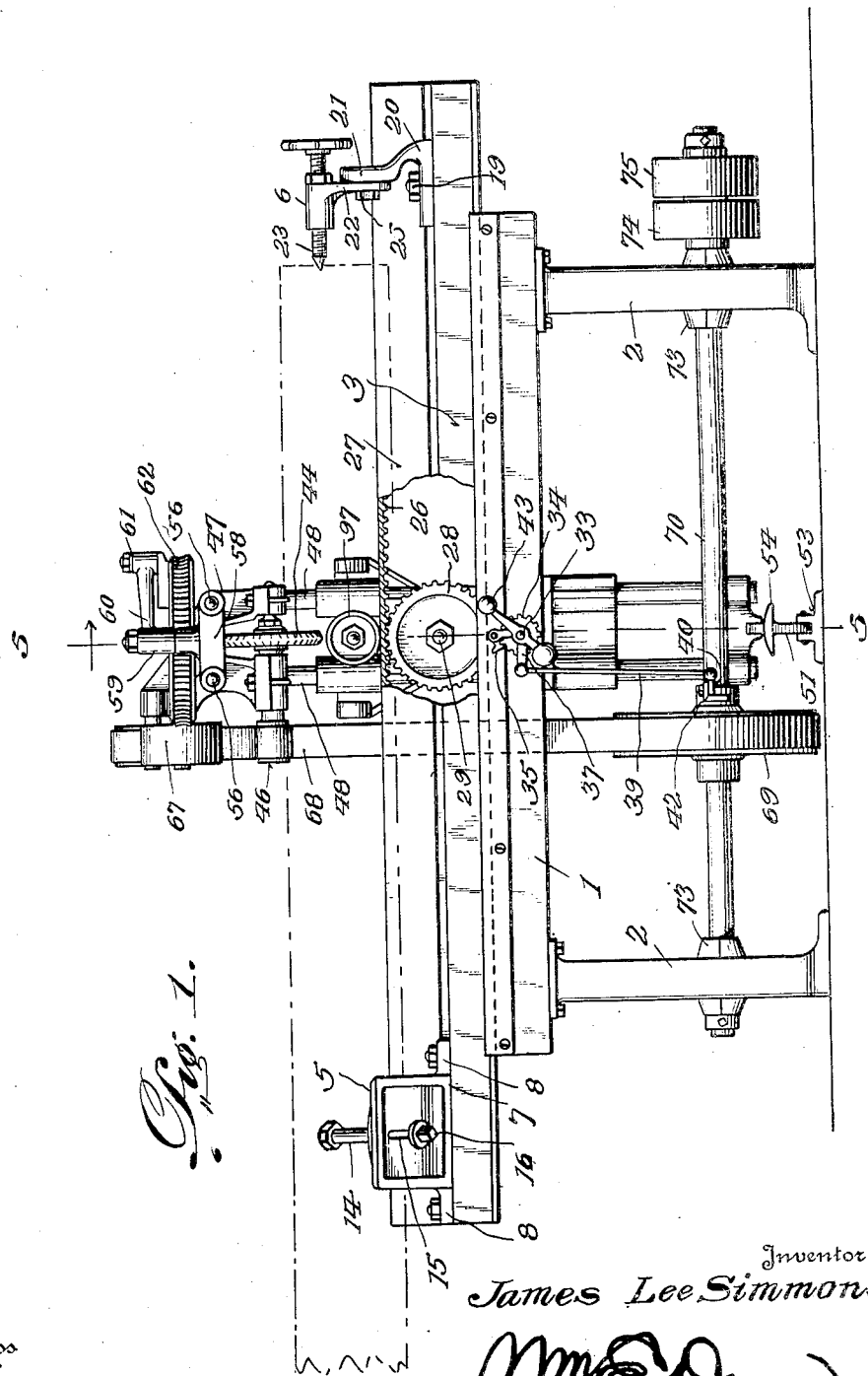

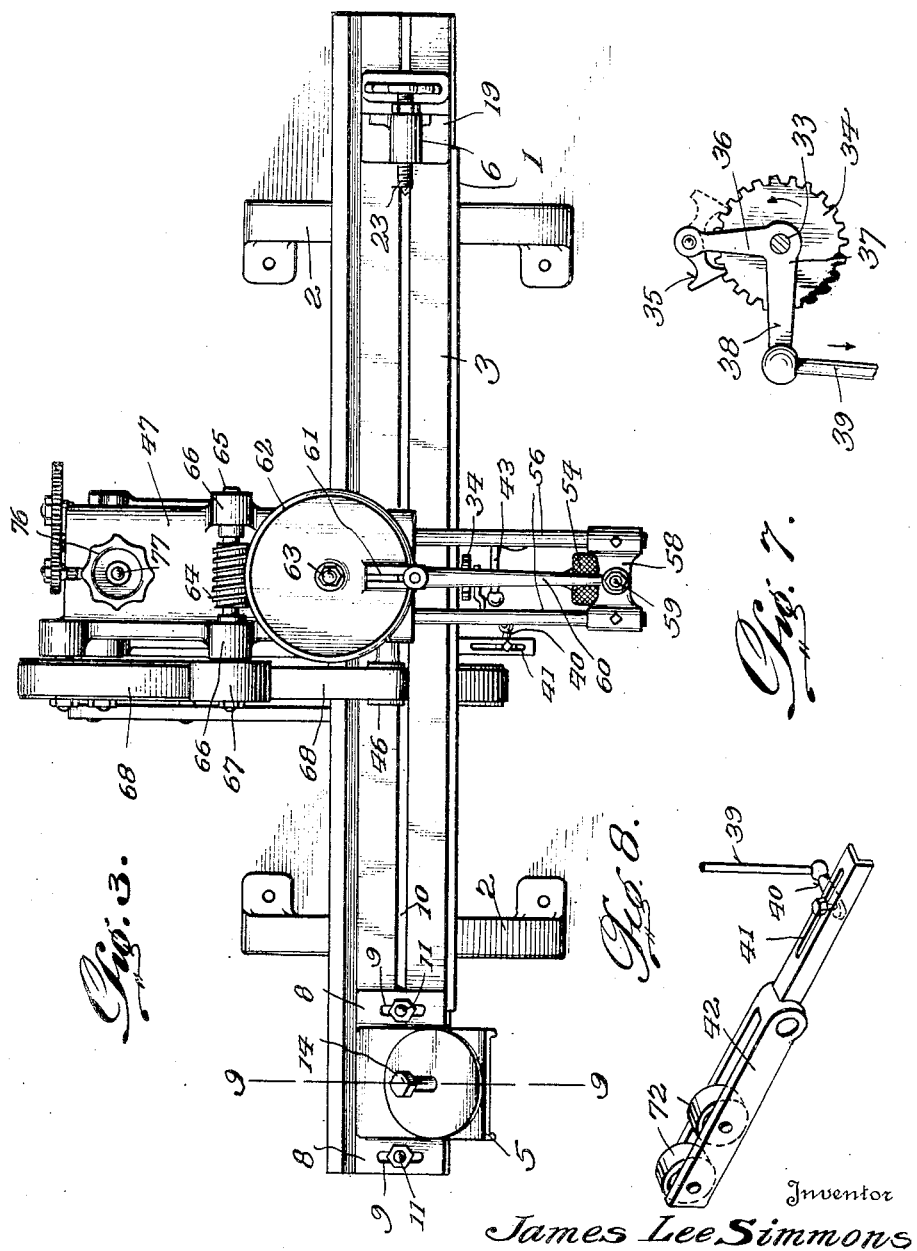

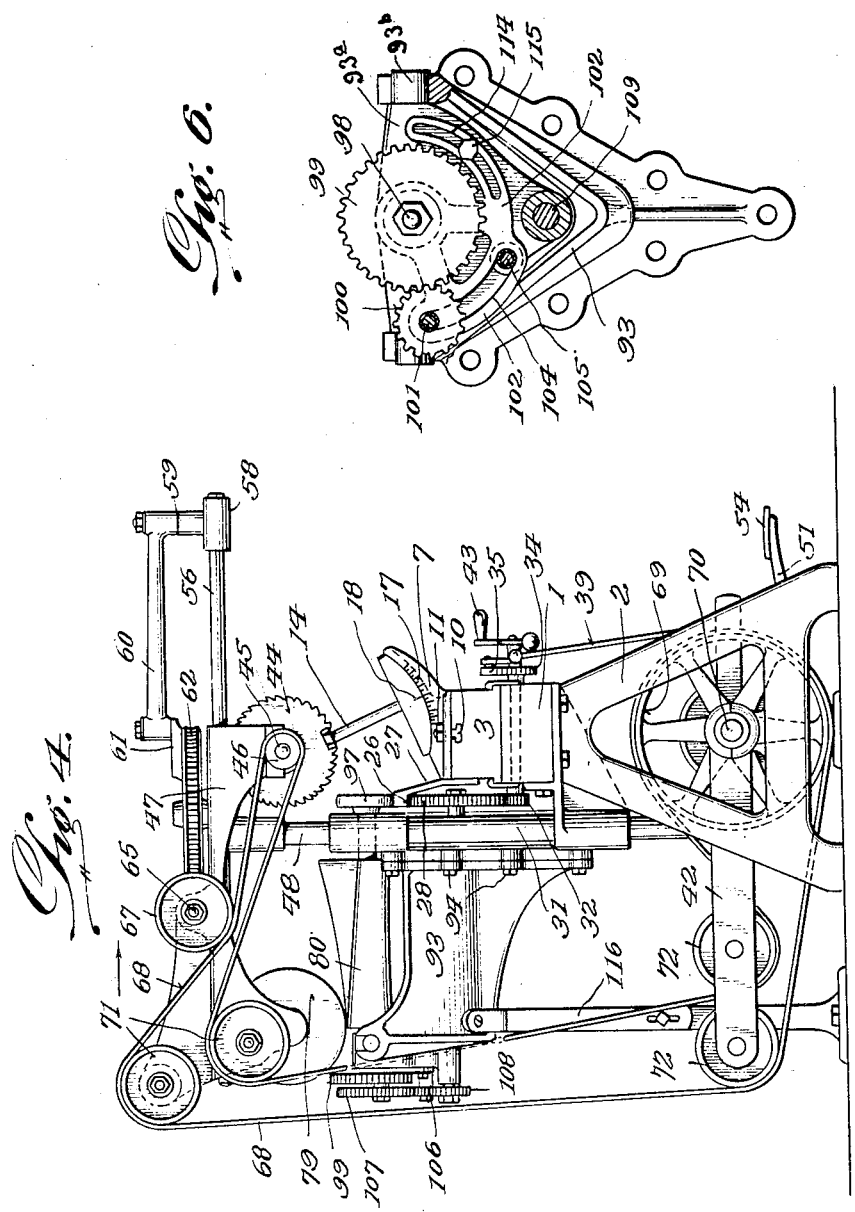

J. L. SIMMONS.
MACHINE FOR MAKING AEROPLANE PROPELLERS.
APPLICATION FILED SEPT. 12, 1917. RENEWED JULY 23, 1919.
1,336,659.
Patented Apr. 13, 1920.
7 SHEETS—SHEET 5.
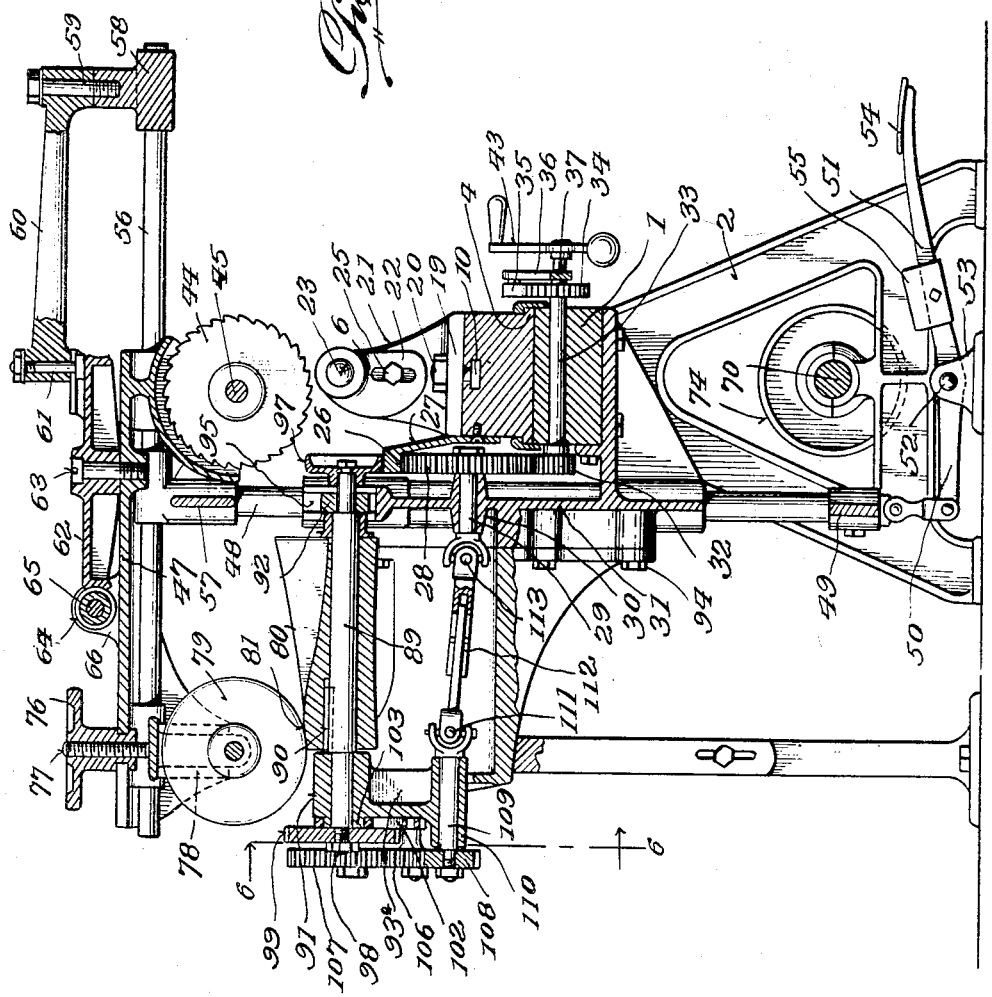
Witness
Frederick L. Fox.
Inventor
James Lee Simmons.
By Wm. E. Dye
Attorney

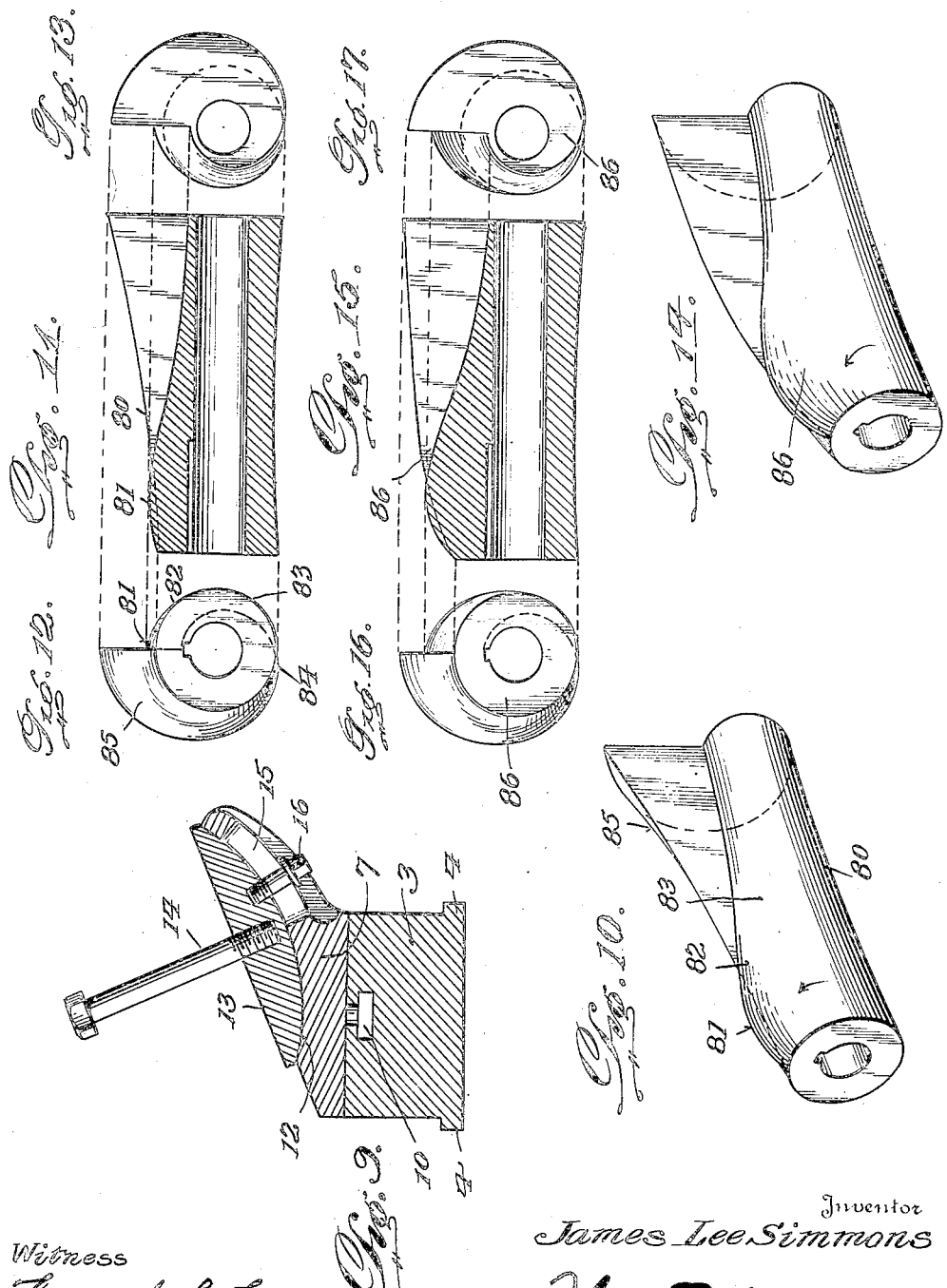

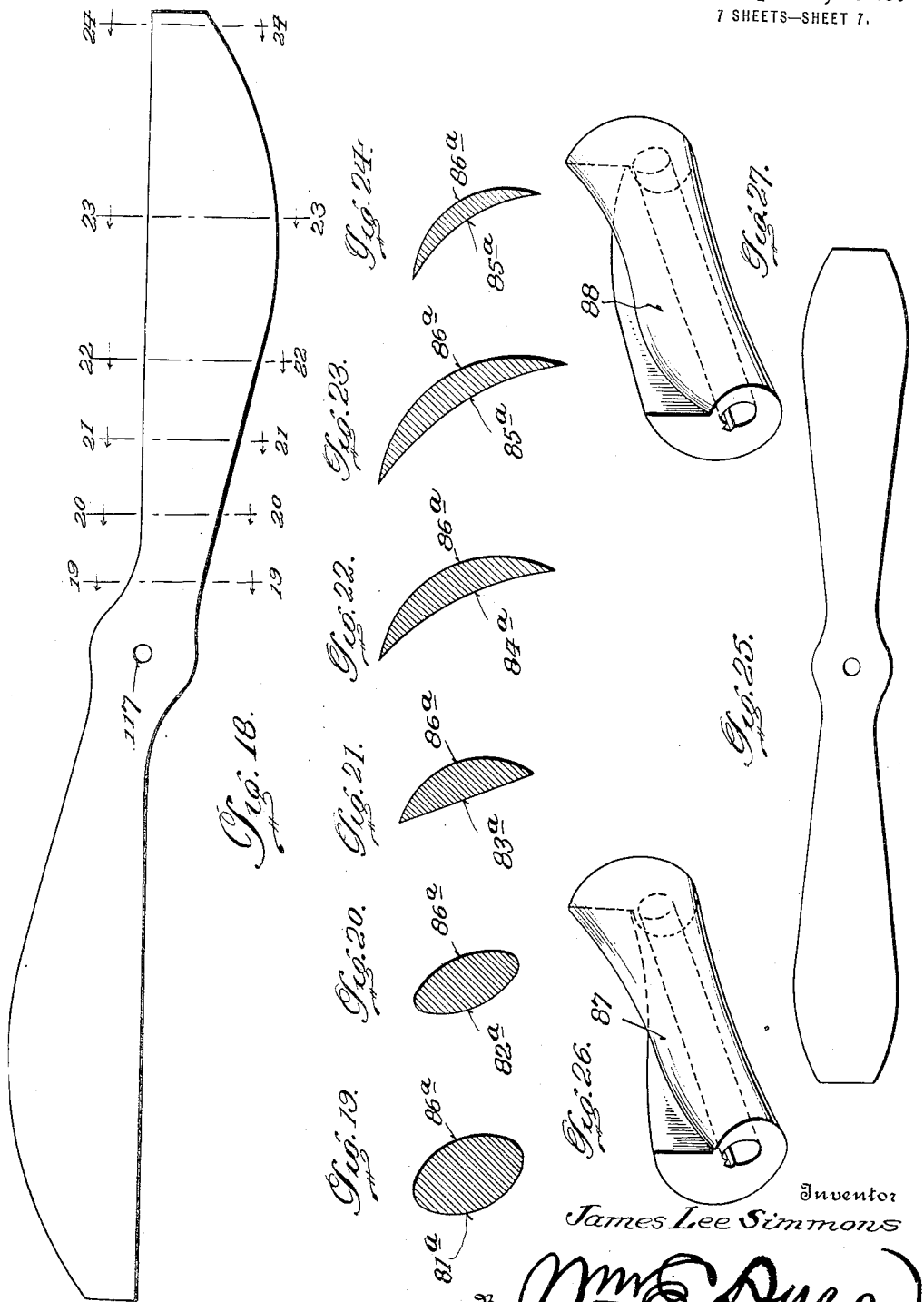

UNITED STATES PATENT OFFICE.

JAMES LEE SIMMONS, OF WASHINGTON, DISTRICT OF COLUMBIA, ASSIGNOR OF FIFTY-ONE PER CENT. TO THOMAS W. BUCKEY AND TWENTY-FOUR AND ONE-HALF PER CENT. TO WILLIAM C. NALLE, BOTH OF WASHINGTON, DISTRICT OF COLUMBIA.

MACHINE FOR MAKING AEROPLANE-PROPELLERS.

1,336,659.  Specification of Letters Patent.  Patented Apr. 13, 1920.

Application filed September 12, 1917. Serial No. 191,057. Renewed July 23, 1919. Serial No. 312,832.

*To all whom it may concern:*

Be it known that I, JAMES LEE SIMMONS, a citizen of the United States, residing at Washington, in the District of Columbia, have invented certain new and useful Improvements in Machines for Making Aeroplane-Propellers; and I do hereby declare the following to be a full, clear, and exact description of the invention, such as will enable others skilled in the art to which it appertains to make and use the same.

This invention relates to certain new and useful improvements in machines for making propellers, and contemplates more especially the production of mechanism for forming the blades of aeroplane propellers.

In the manufacture of an aeroplane propeller at the present time, the highly accurate volute curves are first laid out by suitable markings, and subsequently cut or carved by tools in the hands of skilled mechanics. This method possesses certain disadvantages of slowness and expense in production, which, together with inaccuracies of measurement so frequently found in manufactures dependent upon hand labor, materially reduces the commercial efficiency of the industry.

The present machine has been designed to supplant this tedious method of producing aeroplane propellers, and has for an object the production of a machine capable of cutting the several convexo convex and convexo concave surfaces, and other differential volute curves for various style propellers from a suitable stock.

Another object of this invention is to produce a propeller making machine including in combination a movable carriage having adjustable work supports between which the stock is held, and a relatively movable cutting tool designed to traverse the stock in vertical and transverse planes for shaping the blades from the stock.

Another object of the present invention is the production of a propeller making machine including in combination a movable work support, a relatively movable cutting tool and means including a blade-forming pattern of volute contour for regulating the action of the cutting tool in producing the several convexo-convex and convexo-concave surfaces.

A further object of the invention is to produce a propeller making machine in which any one of several types of blade-forming volute patterns can be readily inserted whereby differential volutes for various style and pitch propellers can be effectively formed.

A still further object of the invention is the production of a propeller making machine including among other things means for adjustably positioning the stock upon a movable carriage, feeding mechanism for said carriage, a positively reciprocated cutting tool, and means for controlling the action of the cutting tool, said means being operated by the aforesaid feeding mechanism.

With these and other objects in view the invention further consists in the arrangement, adjustment and combination of the several mechanisms hereinafter described and pointed out in the appended claims.

In the accompanying drawings which illustrate in detail an embodiment of the invention, and in which corresponding reference characters designate similar parts, Figure 1 is a front elevation of my improved propeller making machine, a portion thereof being broken away.

Fig. 2 is a rear elevation thereof.

Fig. 3 is a top plan view.

Fig. 4 is an end elevation.

Fig. 5 is a vertical sectional view on the line 5—5 of Fig. 1.

Fig. 6 is a detail sectional elevation of the gearing connection for controlling the operation of the propeller pattern.

Fig. 7 is a detail of the reversible pawl which controls the direction of feed of the movable carriage which supports the work.

Fig. 8 is a detail view of the lever connection which operates the feeding mechanism.

Fig. 9 is an enlarged sectional view through the head stock or adjustable support which secures the work upon the movable carriage.

Fig. 10 is a perspective view of the controlling pattern for shaping the inside surface of the propeller blade.

Fig. 11 is a central sectional view through the pattern.

Figs. 12 and 13 are respective end elevations of the pattern.

Fig. 14 is a perspective view of the controlling pattern for shaping the outside surface of the propeller blade.

Fig. 15 is a central sectional view therethrough.

Figs. 16 and 17 are respective end elevations of the pattern.

Fig. 18 is a diagrammatic plan view of the stock from which the propeller blades are formed.

Figs. 19, 20, 21, 22, 23 and 24 are detail diagrammatic sectional views on the respective lines 19—19, 20—20, 21—21, 22—22, 23—23, and 24—24, of Fig 18, illustrating the several curves upon the inside and outside surfaces of the blades of the propeller as shaped by the cutting tool.

Fig. 25 is a diagrammatic plan view of a different style propeller.

Fig. 26 is a perspective view of another form of controlling pattern for shaping the inside surface of a propeller blade of a style shown in Fig. 25, wherein the volute curves are differently formed, and Fig. 27 is a similar view to Fig. 26 illustrating the pattern for forming the outside surface of a propeller blade of a type shown in Fig. 25.

The present invention has been primarily designed for use in the manufacture of aeroplane propellers of both pusher and puller types. These propellers are of a two-blade type, and are carefully designed to insure the most efficient driving and lifting power whether shaped to act as a puller in front of the aeroplane, or as a pusher in the rear thereof. The several convexo-convex, plano-convex, convexo-concave, and volute surfaces of the blades are mathematically computed.

The controlling pattern or shaping volute form is correspondingly designed to reproduce these calculations, when operating to move the cutting tool upon the work as it passes beneath the cutting edge thereof.

Each surface of each blade is cut separately, the work or stock being secured to the movable carriage which reciprocates the length of the blade. After the cutting of one side or surface of the blade, which may be done in several cuts, or preferably in but two, which for the purposes herein will be termed the limit and finish cuts, the stock is turned over and the opposite side or surface is cut. A different pattern is substituted for this cut, as will hereinafter be described.

Upon the completion of one blade the stock is then turned around or reversed, and the opposite blade cut in the same manner. The stock may be reversed and the corresponding surface of the opposite blade cut prior to changing the pattern. This, and other expedient operations, may be performed in the manipulation of the machine as may be desired.

The embodiment of the machine herein shown comprises among other things; a bed upon which is mounted a movable carriage designed to support the work or stock from which the propeller is formed; feeding mechanism for longitudinally reciprocating the work beneath the cutting tool; a cutting or forming tool designed to reciprocally traverse the work in transverse directions to the line of feed in both horizontal and vertical planes; controlling patterns or shaping forms of volute contour for guiding and determining the relative movement of the cutting tool upon the work; and means for operating the said controlling pattern in timed relation with the feed of the movable carriage.

*Work support.*

Referring to the drawings, the machine includes a bed 1 mounted upon suitable standards or legs 2 bolted or otherwise secured to said bed. Slidably mounted between the guide rails and upon the bed 1 is a work supporting carriage 3. Suitable guide rails 5 secured to the bed 1 project over side beads or longitudinally extending shoes 4 and serve to keep the carriage 3 in position upon the bed 1.

Mounted upon the carriage 3 are work supports 5 and 6, between which the stock is held while being formed. Both of these supports are longitudinally and laterally adjustable for correctly positioning and centering the stock beneath the cutting tool.

Referring to Figs. 1, 3, 4 and 9, the head stock or work support 5 comprises a base 7 having longitudinally extending flanges 8 provided with slots 9 through which latter, and a T-groove 10 formed in the carriage 3, bolts 11 pass. By this construction the work support 5 can be readily adjusted longitudinally or laterally of the carriage 3.

The upper surface 12 of the base portion 7 is arcuately shaped as clearly shown in Figs. 4 and 9, and has seated thereon a supporting plate or member 13 the under side of which is correspondingly curved to that of the upper surface 12. A clamping bolt 14 is threaded into the supporting plate 13 and serves to firmly secure the stock or work thereto. The bolt 14 is designed to pass through the usual central opening formed in the propeller as shown in Figs. 18 and 25.

Intermediate the base 7 of the head stock 5 is a slot 15 through which passes a headed bolt 16 adapted to adjustably clamp the supporting plate 13 to the base 7. By this construction, together with the graduation markings 17 on the side wall of the base 7, and the indicating pointer 18 provided on the supporting plate 13, it will be seen that various inclinations of the work or stock can be obtained, thus enabling the operator to secure to a nicety the proper pitch and other shaping cuts. When the headed bolt 16 is loosened the supporting plate 13 together with the work can be rocked upon the arcuate surface of the base 7 in accordance with the adjustment desired, and indicated by the graduated markings, as will be readily understood.

Coöperating with the head stock 5 is the oppositely disposed tail stock or work support 6, see Figs. 1, 3, and 5. The tail stock 6 comprises a base 19 secured to, and longitudinally adjustable upon, the carriage 3 by means of the bolt 20 which passes through the base 19 and into the T-groove 10 formed in the carriage 3. Adjustably mounted upon an arm 21 of the base 19 is a bracket 22 through which passes the threaded centering screw 23, longitudinally movable by agency of the hand wheel 24. The bracket 22 is adjustably secured to the arm 21 by means of the bolt and slot connection 25, which permits of both lateral and vertical movement thereof.

It will be seen from this construction that the centering and supporting screw 23 of the tail stock 6 can be properly alined with the head stock 5, according to the adjusted position of the work determined by the graduation markings 17. It will also be apparent that different length stock can be readily accommodated between these adjustable supports.

The carriage 3 is reciprocated longitudinally by means of a rack 26 formed on a plate 27 secured to one side of the said carriage, and a gear 28 in mesh with said rack and secured to the end of a shaft 29, and journaled in a bearing 30 provided in an intermediate frame 31. The gear 28 meshes with a small pinion 32 secured to one end of a shaft 33 journaled in the bed 1 of the machine. Upon the opposite end of the shaft 33 a toothed wheel 34 is secured, see Figs. 1, 5 and 7. Coöperating with the toothed wheel 34 is a reversible pawl 35 pivotally carried by an upstanding arm 36 of a bell-crank lever 37 loosely mounted upon the shaft 33. Connected to the other arm 38 of the bell-crank lever is the upper end of a rod 39, the lower end of said rod being connected to an arm 40, adjustably secured in a slotted portion 41 of an operating lever 42. The operating lever 42 is pivotally mounted upon the main driving shaft, and carries upon one end guide pulleys over which the driving belt of the machine passes, as will be presently described. From the foregoing construction it will be seen that as the operating lever 42 is rocked in a manner to be described hereinafter, motion will be transmitted to the rod 39 which in turn actuates the bell crank lever 37, thereby causing the pawl 35 to turn the toothed wheel 34. If the pawl 35 be set in the position shown in Fig. 7 of the drawings, motion will be transmitted to the toothed wheel 34 in the direction of the arrow shown thereon, when a downward movement is imparted to the rod 39 by the operating lever 42. As the toothed wheel 34 is intermittently rotated by this operation just described, the shaft 33 is likewise rotated thereby effecting a movement of the pinion 32, the meshing gear 27 and the rack 26 secured to the carriage 3. The carriage 3 is moved in one direction longitudinally of the bed 1 by this operation, and when it has reached the limit of its movement, the pawl 35 is reversed to the position shown in dotted lines in Fig. 7, whereupon the carriage 3 is reciprocated longitudinally of the bed 1 in a reverse direction.

A hand operated crank 43 is also secured to the shaft 33 for effecting an independent or more rapid feeding of the carriage 3 when the pawl 35 is lifted out of contact with the toothed wheel 34.

*Cutting mechanism.*

Referring to Figs. 1, 3, 4, and 5, the cutting mechanism is mounted above the work support and includes a cutting tool 44 revolubly mounted upon a shaft 45, driven by the pulley 46 around which a driving belt passes. The shaft 45 is journaled in suitable bearings depending from a vertically and laterally movable tool supporting carriage 47. The tool supporting carriage 47 is supported by and vertically movable upon spaced rod supports 48 guided through the frame 31 hereinbefore referred to. The vertical movement of the tool supporting carriage is controlled by the form of the pattern to be hereinafter described in connection with the blade forming pattern and mechanism. The rod supports 48 are connected at their lower ends by a cross bar 49 to which is connected one end 50 of a treadle lever 51 pivoted at 52 in the bracket 53 secured or otherwise positioned upon the floor. The opposite end of the treadle lever is provided with a foot or tread portion 54. A weight 55 may also be adjustably positioned upon this end of the lever as shown, to assist in the elevation of the cutting tool mechanism.

In operation, it will be seen that by depressing the tread portion 54 of the treadle lever 51, the rod supports will be moved up thereby elevating the tool supporting carriage 47. This operation serves to quickly lift the cutting tool from the work should occasion require.

The mechanism for reciprocating the cutting tool 44 laterally across the work during the cutting operation is mounted upon the cutting tool supporting carriage, and includes spaced rods 56 secured to a cross head connection 57 at the top of the rod supports 48, and extending laterally upon each side of the cutting tool. The forward ends of the rods 56 are secured together by a cross connection 58, to which is pivotally connected as at 59, one end of a pitman 60. The opposite end of the pitman 60 is adjustably secured by means of the bolt and slide connection 61 to the top side of a worm gear 62 rotatably mounted upon a central support 63 extending upwardly from the tool supporting carriage. Meshing with the worm gear 62 is a worm 64 secured to a shaft 65 journaled in bearings 66 formed on the tool supporting carriage. A pulley 67 is secured to the end of the shaft 65 and receives motion from a belt 68 driven over a series of idler pulleys on the tool supporting carriage, from a driving pulley 69 secured to the main driving shaft 70.

Referring to Figs. 1 and 4, more particularly, the belt 68 is shown passing around the pulley 46 mounted upon the shaft 45 to which the cutting tool 44 is secured; and thence running beneath the pulley 67 secured to the shaft 65 upon which the worm 64 is secured; then over spaced idler pulleys 71 mounted upon the rear end of the tool supporting carriage 47; then downwardly beneath similar idler pulleys 72 mounted upon one end of the operating lever 43, hereinbefore described; and finally around the driving pulley 69.

The driving pulley 69 is mounted upon the shaft 70 which is journaled in bearings 73 provided in the leg supports or standards 2. Suitable fast and loose pulleys 74 and 75 are also mounted upon the shaft 70, and by agency of a belt receive power from any suitable source (not shown). In operation, the cutting tool mechanism receives power from the driving belt 68 which drives the cutting tool 44 and simultaneously operates the worm 64 to reciprocate the tool supporting carriage 47 transversely across the work continuously during the blade cutting operation. As the tool supporting carriage 47 is moved forwardly from the position shown in Fig. 4, by virtue of the relatively fixed pitman 60 and the worm gear 62 which revolves beneath the same, it will be seen that the driving belt 68 is correspondingly moved together with the idler pulley 71. This shifting of position causes the belt 68 to pull upon the lower idler pulleys 72, thereby slightly elevating the operating lever 42 and actuating the feeding mechanism through the rod 39 and associated pawl 35, hereinbefore described. The continued movement of the worm gear 62 serves to return the tool supporting carriage 47, whereupon the operating lever 42 is again lowered, the pawl 35 operated by the rod 39 riding freely over the toothed surface of the wheel 34, as will be readily understood.

The traversing of the work by the revolving cutting tool in a lateral direction continues throughout the length of the blade of the propeller, which is being fed longitudinally of the machine by the mechanism actuated upon each lateral reciprocation of the tool supporting carriage.

The machine has been designed to form each side of the blade in two cuts, that is to say, the longitudinal reciprocation of the stock in one direction will remove the rough or limit cut, and the return movement of the stock in the opposite direction will apply the finish cut to the blade.

The cut regulating device for obtaining the above limit and finish cuts is best illustrated in Fig. 5, and comprises a hand-wheel 76 revolubly secured to the tool supporting carriage, and through which hand-wheel passes the threaded stem 77 of an adjustable bearing support 78. Mounted in the bearing support 78 is a roller 79 the function of which is to move upon the surface of the blade forming pattern, now to be described, as the tool supporting carriage is reciprocated across the work. By this construction it will be obvious that the turning of the hand wheel 76 will relatively shift the bearing support 78 and in turn the roller 79, thereby elevating or depressing the tool cutting carriage with relation to the blade forming pattern over which the roller moves.

*Blade forming pattern.*

The pattern over which the roller 79 moves, serves to guide the cutting tool 44 upon the stock, thereby producing the several convexo-convex, plano-convex, and convexo-concave surfaces shown by the cross-sectional areas in the diagrammatical Figs. 19 to 24 inclusive.

A different blade forming volute pattern is used for the opposite side of the blade of the propeller, and different forms of volute patterns are also substituted for forming the blades of a propeller of a type shown in Fig. 25, and other modifications thereof.

Referring to Figs. 5 and 10 to 24 inclusive, the blade forming pattern 80 shown in place upon the machine in Fig. 5, and in detail in Figs. 10 to 13 inclusive, is designed to shape the inside of the blade, and consists of a body portion of volute formation which is slightly concaved throughout its length, as shown in Fig. 10. The pattern 80 is rotated in the direction of the arrow shown thereon in Fig. 10 by a mechanism to be presently described, and operated by the feeding means hereinbefore referred to. During the time when the stock positioned in the carriage 3 is being longitudinally fed beneath the reciprocating cutting tool, the blade forming pattern 80 is rotated by means of its supporting shaft and interconnected gearing. The blade forming pattern can be timed to make almost a complete revolution or any portion thereof during the time that it takes the work supporting carriage 3 to move the stock longitudinally in one direction beneath the cutting tool.

The pattern 80 which forms the inside of the blade of the propeller is formed with an enlarged curved portion 81 over which the roller 79 passes in its movement back and forth throughout the length of the pattern. This portion 81 acts to direct the cutting tool in producing the convex surface 81$^a$ upon the inside of the blade indicated in Fig. 19 of the drawing taken as a diagrammatic cross section through the blade on line 19—19 of Fig. 18. The enlarged portion 81 rounds off gradually as at 82 into the body portion of the pattern, and serves to direct the cutting tool in forming the convex surface indicated at 82$^a$ in Fig. 20, upon the inside of the blade, taken a little farther out into the blade where the thickness thereof is reduced as indicated by the line 20—20 in Fig. 18. Continuing, the portion 82 of the pattern curves in such a manner as indicated at 83 to cause the cutting tool to produce a substantially flat surface or plane shown at 83$^a$ in Fig. 21 on the inside of the blade. Merging from the portion 83 the volute continues, beginning from a point indicated at 84 (see Fig. 12) and gradually flaring out in cone-like formation toward the opposite end of the pattern as indicated at 85. The portion 84 of the pattern serves to direct the cutting tool in forming the concave surfaces 84$^a$ shown in Fig. 22, and in Figs. 23 and 24 the concave surfaces 85$^a$ are further indications of the gradual cutting of the concave surface to the end of the blade.

The blade forming pattern 86 shown in Figs. 14 to 17 inclusive, is adapted to direct the cutting tool in forming the outside surface of the blade indicated by the convex surfaces 86$^a$ in Figs. 19 to 24.

The general volute contour of the pattern 86 is somewhat similar to that of the pattern 80, with the exception that the several curved portions of the pattern 86 are formed to produce a substantially continuous convex surface upon the outside of the propeller blade.

In Figs. 26 and 27 a modified form of inside and outside blade forming pattern is shown. These patterns are indicated at 87 and 88, respectively, and serve to direct the cutting tool upon the stock from which is to be produced a propeller after the style shown in Fig. 25. These and other variations in the volute contour of each pattern may be resorted to without departing from the spirit of my invention, and I do not limit myself to the exact forms herein shown.

Mechanism for operating patterns.

Referring to Figs. 2, 5 and 6:

The blade-forming pattern is supported upon a shaft 89, to which it is secured in any suitable manner, as, for example, by the key indicated at 90. The shaft 89 is reduced in diameter at its front end, as indicated at 96, and this reduced portion is supported in a bearing block 92 capable of sliding vertically in guide ways, one of which is indicated at 95, Fig. 5.

The rear end of the shaft 89, also is reduced in diameter and is mounted in a bearing 91 formed in a trunnioned member 93$^a$ having trunnions 93$^b$ mounted in open slots carried by a trough like supporting bracket 93 secured to the frame 31 by bolts 94.

The reduced end 96 of shaft 89 projects through its bearing block 92 and carries on its projecting end a guide wheel 97 arranged to roll freely upon the upper surface of the rack-plate 27, as the carriage 3 is reciprocated longitudinally.

To the extreme rear end of the shaft 89 is secured a gear wheel 99, in any suitable way. In the drawing, Fig. 5, the shaft is shown as reduced and screw threaded, as indicated at 98, the screw threaded portion being inserted through the wheel 99 and held to it firmly by a nut.

The gear-wheel 99 meshes with a pinion 100, rotatable on a stub shaft 101 fixed to a slotted segment 102 which is arranged to swing on a reduced portion 103 of the bearing 9 (see Fig. 5). To the gear 100 is fixed a gear wheel 107 which is arranged to be brought into mesh with an idler pinion 106 rotatable on a stub shaft 105 passing through a slot 104 in the slotted segment 102 and fixed in the trunnioned member 93$^a$.

The idler pinion 106 meshes with a gear wheel 108 secured to the end of a shaft 109, which extends through a bearing 110 carried by the trunnioned member 93$^a$.

The shaft 109 has its front end connected through universal joint connections 111 and 113 and an intermediate telescopic connection 112 with the shaft 29 hereinbefore described.

By this construction motion is transmitted from the shaft 29 through the gearing 108, 106, 107, 100 and 99 to the shaft 89 on which is fixed the blade-forming pattern 80.

The slotted segment 102 is provided with a second slot 114 through which extends a machine screw indicated at 115, Fig. 6, by means of which the slotted segment may be clamped to the trunnioned member. By loosening the screw 115, the segment 102 may be adjusted as required according to the diameters of the gear wheels employed.

These various intermeshing gears carried at the rear end of the trunnioned member 93ª constitute a change gear system, by which the ratio of transmission of the motion of tht shaft 29 to the pattern 80 may be changed as required. This permits the use of the same pattern for the production of propellers of different sizes.

It will be understood that various combinations of change gearing can be employed, as may be required. The direction of rotation of the pattern relative to the shaft 29 may be reversed by eliminating the idler pinion 106, and swinging the slotted segment to bring the gear wheel 107 into mesh with the gear 108.

When necessary to renew the pattern, the pattern, the shaft 89 and the trunnioned member 93ª may be removed as a unit, from the trough shaped support 93, the bearing 92 sliding upward out of its guide ways 95. Thus the change of patterns may be done readily at a work-bench, by removing the guide roller 97 and forcing the pattern 80 in a forward direction off the shaft 89. The new pattern is then slid onto the shaft 89, the roller 92 replaced and the whole unit replaced in the machine.

For the purpose of supporting the rear end of the trough-like bracket 93, an adjustable leg or support 116 extends from the bracket to the floor.

*Operation of machine.*

The stock from which the propeller is formed is preferably made of laminated layers of wood glued or otherwise secured together. This stock is provided with a central opening 117 through which the clamping bolt 14 provided on the head support 5 passes. When in place, the supporting plate 13 is then relatively adjusted by loosening the bolt 16 in the slot 15, until the proper arcuate position of the work is obtained by calculations contained upon the graduations 17. After the desired inclination has been determined, the stock is fastened to the head support 5, and the opposite support 6 or tail stock is correspondingly adjusted until the centering screw 23 is longitudinally alined with relation to the head stock and the work is fastened upon the movable carriage support 3 beneath the cutting tool 44. The cutting tool 44 is now adjusted by operating the hand wheel 76 to produce the first or limit cut of the blade. Referring to Figs. 1, 3, 4 and 5, and assuming that the blade forming pattern 80 for producing the cut upon the inside of the blade is on the machine, and that the stock has been positioned upon the work support with the inside portion thereof turned upwardly, power is transmitted to the machine through the belt 68 operating over the pulley 69 in the direction of the arrow shown in Fig. 4. The cutting tool 44 is continuously operated by this belt by reason of it passing around the pulley 46; likewise the worm 64 and worm gear 62 controlling the reciprocation of the cutting tool are also continuously driven by the belt 68 passing beneath the pulley 67 secured to the worm shaft 65. The operating lever 42 which carries the idler pulleys 72 under which the belt 68 passes, is rocked upon each reciprocation of the cutting tool 44. As the tool supporting carriage which carries the idler pulleys 71 is moved forwardly in the direction of the arrow shown in Fig. 4, the shifting of the belt 68 tends to elevate the lever 42, thereby depressing the rod 39 secured to the opposite end of the lever 42. When the rod 39 is pulled downwardly, the bell-crank lever 37 carrying the pawl 35 is rocked and the shaft 33 given an intermittent rotary movement. This motion is transmitted from the shaft 33 through the small pinion 32 to the gear 28 which in turn feeds the rack 26 with which it meshes, thereby causing the work support or movable carriage 3 to be intermittently fed beneath the cutting tool. At the same time motion is also transmitted through the shaft 29, universal connections 113 and 111 to the shaft 110 to which latter is secured the gear 109. This gear 109 meshing with the idler gear 106 (see Fig. 2) which in turn meshes with the larger gear 107 on the stub shaft 101, serves to drive the gear 100 upon the said stub shaft, thereby driving the larger gear 99 with which the gear 100 meshes. The larger gear 99 being secured to the pattern supporting shaft 89 causes the pattern 80 thereon to be intermittently rotated simultaneously with the feeding of the work support.

As the tool supporting carriage carrying the cutting tool 44 reciprocates back and forth over the work, it will be seen that the supporting carriage 3 and the blade forming pattern are intermittently operated for gradually producing the several convex and concave surfaces upon the inside of the blade. The roller 79 working upon the pattern serves to guide the cutting tool 44 in lateral vertical planes across the work. When the end of the limit cut is reached, the operator again turns the hand wheel 76 to regulate the cutting tool for the finish cut. The pawl 35 is also reversed to the position shown in dotted lines in Fig. 7, thereby producing the reverse operation of the mechanism described.

The propeller is now swung around so that the inside of the opposite blade can be cut. Upon the completion of the operation the blade forming pattern is changed to that form shown in Fig. 14, whereupon the outside surface of the blade is formed in the same manner as the inside surface.

When propellers of a different type are being produced, volute patterns of a form shown in Figs. 26 and 27 may be substituted. Also it will be understood that various combinations in direction and speed of rotation of the pattern can be obtained by the construction of interchangeable gearing for driving the said pattern as has been hereinbefore described.

From the foregoing it will be apparent that I have produced an efficient and commercially successful machine for producing aeroplane propellers, in which numerous differential combinations of volute and other form patterns can be obtained whereby various combinations of convex, concave, plane and volute surfaces are produced according to predetermined mathematical calculations.

Having thus described my invention, what I claim and desire to secure by Letters Patent is:

1. In an aeroplane propeller making machine the combination with a movable work support of a cutting tool movable in a path transversely to the path of movement of the work support, a blade forming pattern for guiding the tool, said pattern being arranged to revolve on an axis transversely positioned to the path of travel of the work support, means for moving said work support, means for moving the cutting tool, and means for revolving the pattern.

2. In an aeroplane propeller making machine the combination with a movable work support of a cutting tool movable in a path transversely to the path of movement of said work support, a blade forming pattern for guiding the tool, said pattern being arranged to revolve on an axis transversely positioned to the path of travel of the work support, means for moving the cutting tool, means for moving said work support, and means interposed between the work support and pattern for revolving the latter.

3. In an aeroplane propeller making machine the combination with a movable work support of a cutting tool adapted to reciprocate in a path transversely to the path of movement of said work support, a blade forming pattern for guiding the tool, said pattern being arranged to revolve on an axis transversely positioned to the path of travel of the work support, means for moving said work support, means for reciprocating the cutting tool and means interposed between the work support and pattern for revolving the latter.

4. In an aeroplane propeller making machine the combination with a longitudinally movable work support of a cutting tool movable in a path transversely to the path of movement of said work support, a pattern mounted on an axis transversely positioned to the path of travel of the work support for guiding said cutting tool, means for moving said cutting tool, means for moving said work support, and means interconnected with the last mentioned means for revolving the pattern.

5. In an aeroplane propeller making machine the combination with a longitudinally movable work support of a reciprocating cutting tool movable in a path transversely to the path of movement of said work support, a pattern mounted on an axis transversely positioned to the path of travel of the work support for guiding said cutting tool, means for moving said work support, and means interconnected with the aforesaid means for revolving the pattern and reciprocating the cutting tool.

6. In an aeroplane propeller making machine the combination with a longitudinally movable work support of a transversely reciprocating revolving cutter, a pattern revolubly mounted on an axis transversely positioned to the path of travel of the work support for guiding said cutting tool, means for moving said work support, and means for revolving the pattern and cutting tool, and reciprocating the latter.

7. In an aeroplane propeller making machine the combination with a longitudinally movable work support of a cutting tool movable in a path transversely to the path of movement of said work support, a pattern mounted on an axis transversely positioned to the path of travel of the work support for guiding said cutting tool, and means for moving said cutting tool, work support and revolving the pattern simultaneously.

8. In an aeroplane propeller making machine the combination with a longitudinally movable work support of a reciprocating cutting tool movable in a path transversely to the path of movement of said work support, a pattern mounted on an axis transversely positioned to the path of travel of the work support for guiding said cutting tool, means for moving said work support, and means interconnected with the aforesaid means for reciprocating the cutting tool and revolving the pattern simultaneously.

9. In an aeroplane propeller making machine the combination with a longitudinally movable work support of a cutting tool movable in a path transversely to the path of movement of said work support, a pattern mounted on an axis transversely positioned to the path of travel of the work support for guiding said cutting tool, means for moving said cutting tool, means for moving said work support and means for intermittently rotating the pattern.

10. In an aeroplane propeller making machine the combination with a longitudinally movable work support of a cutting tool movable in a path transversely to the path of movement of said work support, a pattern mounted on an axis transversely positioned to the path of travel of the work support for guiding said cutting tool, means for moving said cutting tool, means for intermittently moving said work support, and means interconnected with the aforesaid means for intermittently rotating said pattern.

11. A propeller making machine of the class described including in combination a cutting tool and work supporting carriage, means for moving the cutting tool, a rotatably mounted pattern for guiding said cutting tool said pattern being located in the plane of movement of the cutting tool, means for moving the pattern interconnected with the aforesaid means, and means interconnected with the last mentioned means for moving the work supporting carriage.

12. In a propeller making machine of the class described the combination of a work supporting carriage with a cutting tool, means for reciprocating the cutting tool, means including an endless belt for revolving the cutting tool, and means including a lever operated by said belt upon each reciprocation of the cutting tool for feeding the supporting carriage beneath the cutting tool.

13. In a propeller making machine of the class described the combination of a work supporting carriage with a cutting tool, means for reciprocating the cutting tool, means including an endless belt for revolving the cutting tool, means including a lever operated by said belt upon each reciprocation of the cutting tool for feeding the supporting carriage beneath the cutting tool, and means including a pattern operated by said lever for guiding the cutting tool upon the work.

14. A propeller making machine of the class described including in combination a bodily movable work supporting carriage a cutting tool movable in a path transversely of the path of movement of said work support, means for operating the cutting tool, a pattern for guiding said cutting tool, said pattern being transversely revoluble to said cutting tool, means for revolving said pattern interconnected with the aforesaid means, and means interconnected with last mentioned means for moving the work supporting carriage transversely of the pattern and cutting tool.

15. A propeller making machine of the class described including in combination, a bodily reciprocating work supporting carriage, a cutting tool movable in a path transversely to the path of movement of said work support, a pattern for guiding said cutting tool mounted on an axis transversely positioned to the work supporting carriage, and means for presenting different portions of the pattern upon each reciprocation of the work supporting carriage.

16. A propeller making machine of the class described including in combination a bodily movable work supporting carriage and movable in a path transversely to the path of movement of said work supporting carriage, a cutting tool mounted above said carriage, a pattern arranged in alinement with said cutting tool on an axis in the plane of movement of the cutting tool and transversely of the work supporting carriage, means for moving said work supporting carriage, and means for moving the pattern and cutting tool in timed relation.

17. A propeller making machine of the class described including in combination a bodily movable work supporting carriage, means for moving said carriage, a cutting tool supporting carriage mounted above said work supporting carriage, means for reciprocating said tool supporting carriage transversely across the path of travel of the work supporting carriage, a pattern positioned transversely of the work supporting carriage on an axis in the plane of movement of the cutting tool, means for moving the tool in vertical planes while moving across the work supporting carriage, and means for moving said pattern.

18. A propeller making machine of the class described including in combination a bodily movable work supporting carriage, a movable cutting tool, a pattern mounted on an axis transversely disposed to the path of travel of the work supporting carriage and in the plane of movement of the cutting tool, a follower adapted to traverse the pattern in alinement with its axis, means for moving the work supporting carriage, and means for moving the follower upon the pattern.

19. A propeller making machine of the class described including in combination a bodily movable work supporting carriage, a movable cutting tool, a pattern mounted on an axis transversely disposed to the path of travel of the work supporting carriage and in the plane of movement of the cutting tool, a follower adapted to traverse the pattern in alinement with its axis, means for moving the work supporting carriage, and means interconnected with the aforesaid means for moving the follower upon the pattern.

20. A propeller making machine of the class described including in combination, a bodily movable work supporting carriage, a movable cutting tool, a pattern for guiding the cutting tool mounted on an axis in the plane of movement of the cutting tool, a follower adapted to reciprocate longitudinally of the pattern in vertical planes and in a path of travel different from that of the work supporting carriage, means for moving the work supporting carriage, and means for moving the follower upon the pattern.

21. A propeller making machine of the class described including in combination, a bodily movable work supporting carriage, a movable cutting tool, a movable pattern for guiding the cutting tool, said pattern being mounted on an axis in the plane of movement of said cutting tool, a follower adapted to move longitudinally of the pattern in a fixed path of travel, means for moving the work supporting carriage transversely of the path of travel of the follower, and means interconnected with the foregoing means for rotating the pattern, and moving the follower.

22. A propeller making machine of the class described including in combination a bodily movable work supporting carriage, a movable cutting tool, a movable pattern for guiding the cutting tool, said pattern being mounted on an axis in the plane of movement of the cutting tool, a follower adapted to move upon the pattern in longitudinal alinement and in vertical planes therewith, means for rotating the pattern for varying the degree of movement of the follower in said vertical planes, and means for moving the follower.

23. A propeller making machine of the class described including in combination a bodily movable work supporting carriage, a movable cutting tool, a movable pattern for guiding the cutting tool mounted on an axis in the plane of movement of said cutting tool, a follower adapted to move upon the pattern in longitudinal alinement and in vertical planes therewith, means for intermittently rotating the pattern for varying the degree of movement of the follower in said vertical planes, and means for continuously reciprocating the follower.

24. A propeller making machine of the class described including in combination a bodily movable work supporting carriage, a movable cutting tool, a pattern for guiding said cutting tool mounted on an axis in the plane of movement of the cutting tool, a follower adapted to reciprocate longitudinally of the pattern in vertical planes and in a path of travel different from that of the work supporting carriage, means for moving the work supporting carriage, means for reciprocating the follower upon the pattern, and means for adjusting said follower with relation to the work supporting carriage for varying the cut of the aforesaid tool.

25. A propeller making machine of the class described including in combination a movable work support and reciprocating cutting tool, a pattern for guiding said cutting tool upon the work as it is fed by the work support, means for rotating the pattern, and means for operating the foregoing mechanism, said means comprising a power-driven endless belt and an actuating lever having on one end idler pulleys around which the belt passes and on the opposite end a pawl controlled connection for feeding the work support and rotating the pattern.

26. A propeller making machine of the class described including in combination a movable work supporting carriage, a pulley mounted on said carriage, a movable tool supporting carriage, a revolving cutting tool mounted in said tool supporting carriage, a pattern mounted on an axis transversely positioned to the path of travel of the work supporting carriage, means for moving the work supporting carriage, and means including a belt interconnected with the aforesaid means and passing over said pulley for moving the tool supporting carriage, revolving the cutting tool and moving the pattern.

27. A propeller making machine of the class described including in combination a bodily movable work supporting carriage, a movable cutting tool, a rotatable blade forming pattern, a support for said pattern mounted transversely of the path of travel of the work supporting carriage and in the plane of movement of the cutting tool, means for bodily moving said supporting carriage, and means including a series of gears interconnected with the aforesaid means for rotating said pattern.

28. A propeller making machine of the class described including in combination a bodily movable work supporting carriage, a cutting tool movable in a plane transversely to the path of movement of said supporting carriage, a rotatable blade forming pattern, a support for said pattern mounted transversely of the path of travel of the work supporting carriage and on an axis in the plane of movement of the cutting tool, means for bodily moving said supporting carriage, and means including an actuating lever interconnected with the aforesaid means for rotating said pattern.

29. A propeller making machine of the class described including in combination a bodily movable work supporting carriage, a movable cutting tool, a rotatable blade forming pattern, a support for said pattern mounted transversely of the path of travel of the work supporting carriage on an axis in the plane of movement of the cutting tool, means for bodily moving said supporting carriage, means interconnected with the aforesaid means for rotating said pattern, means for varying the speed of said last mentioned means, said means comprising a gear carried by the aforesaid support, a plurality of gears intermeshing therewith, and an adjustable support for said plurality of intermeshing gears.

30. A blade forming pattern for a propeller making machine comprising a body portion having an opening therein, a keyway in said opening, and a series of volute surfaces arranged on the body portion.

31. A blade forming pattern for a propeller making machine comprising a body portion having an opening therein, and a volute surface arranged on the body portion.

32. A blade forming pattern for a propeller making machine comprising a body portion having circumferentially formed volute and longitudinally arranged irregular surfaces.

33. A blade forming pattern for a propeller making machine comprising a body portion having longitudinally formed volute and circumferentially eccentric surfaces.

34. In a propeller making machine the combination with a bodily movable work supporting carriage and cutting tool, of a rotatable blade forming pattern, means for intermittently operating said pattern, and means for supporting one end of said pattern upon the movable work supporting carriage.

35. A propeller making machine of the class described including in combination a bodily movable work supporting carriage, a movable tool supporting carriage, guiding means including vertically and horizontally disposed bars for said tool supporting carriage, and means for moving said tool supporting carriage.

36. A propeller making machine of the class described including in combination a movable work support and cutting tool, a blade forming pattern mounted upon an axis transversely positioned to the path of travel of the work support, means for moving said work support, and means carried at one end of the aforesaid axis for supporting said pattern upon the moving work support.

37. A propeller making machine of the class described including in combination a movable work support and cutting tool, a blade forming pattern mounted upon an axis transversely positioned to the path of travel of the work support, means for moving said work support, and means including a roller carried at one end of the aforesaid axis for supporting said pattern upon the moving work support.

38. In a propeller making machine of the class described the combination of a work supporting carriage with a cutting tool, means for reciprocating said cutting tool, a series of pulleys mounted on said supporting carriage, an endless belt adapted to pass over said pulleys for revolving the cutting tool, and means including a lever and a pulley carried thereby operated by said belt upon each reciprocation of the cutting tool for feeding the supporting carriage beneath the cutting tool.

39. A propeller making machine of the class described including in combination a work supporting carriage and cutting tool, a pattern for guiding said tool upon the work, and means for independently adjusting the work angularly in the plane of travel of the cutter for giving different pitches to the work produced.

40. A propeller making machine including in combination a bodily movable work support, a pattern mounted with its contour transverse to the path of movement of the work support, a cutting tool mounted for reciprocation in alinement with the longitudinal axis of the pattern and means in contact with the pattern to guide the cutting tool in its path, the pattern being revoluble transversely of the path of the pattern contacting means to present different contours thereto.

41. The combination, with a work support, a cutter head, a pattern having contours in one direction corresponding to transverse contours to be given the work, and a follower for following the contours of the pattern, of means for causing a relative reciprocating movement of the cutter head and work support in a direction transverse to the work and for causing simultaneously a relative reciprocating movement of the follower and pattern in the direction of the pattern contours, connections whereby the relative motion of the follower and pattern. due to the contours produces a relative motion of the cutter head and work support toward and away from each other, and means for causing a relative longitudinal feed movement of the work support and cutter head, and simultaneously a corresponding smaller relative shifting of the pattern and follower in a direction transverse to the direction of the pattern contours whereby a different contour is brought into coöperation with the follower.

42. The combination, with a work support, a cutter head, a pattern having contours in one direction corresponding to transverse contours to be given the work, and a follower for following the contours of the pattern, of means for causing a relative reciprocating movement of the cutter head and work support in a direction transverse to the work and for causing simultaneously a relative reciprocating movement of the follower and pattern in the direction of the pattern contours, connections whereby the relative motion of the follower and pattern due to the contours produces a relative motion of the cutter head and work support toward and away from each other, feeding means for causing a relative longitudinal feed movement of the work support and cutter head, and shifting means for causing a relative shifting of the pattern and follower in a direction transverse to the direction of the pattern contours said shifting means comprising mechanism whereby the ratio of the feed movement to the relative shift of pattern and follower may be varied.

43. The combination, with a work support, a cutter head, and a revoluble pattern having contours in an axial direction corresponding to transverse contours to be given the work, of a follower for following the contours of the pattern, means for causing a relative reciprocating movement of the cutter head and work support in the direction transverse to the work and for causing simultaneously a relative reciprocation of the pattern and follower in the direction of the axis of the pattern, connections between the follower and cutter-head whereby the relative motion of the follower and pattern due to the contours produces a relative motion of the cutter head and work support toward and away from each other, and means for causing a relative longitudinal feed movement of the work support and cutter head and simultaneously a corresponding angular movement of the pattern on its axis to bring a different contour into coöperation with the follower.

In testimony whereof I affix my signature in presence of two subscribing witnesses.

JAMES LEE SIMMONS.

Witnesses:
 WM. E. DYRE,
 THOMAS DURANT.